United States Patent
Baba

(10) Patent No.: US 9,901,995 B2
(45) Date of Patent: Feb. 27, 2018

(54) RADIUS END MILL AND CUTTING WORK METHOD

(71) Applicant: MITSUBISHI HITACHI TOOL ENGINEERING, LTD., Tokyo (JP)

(72) Inventor: Makoto Baba, Yasu (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 0 days.

(21) Appl. No.: 15/032,521

(22) PCT Filed: Nov. 8, 2014

(86) PCT No.: PCT/JP2014/079652
§ 371 (c)(1),
(2) Date: Apr. 27, 2016

(87) PCT Pub. No.: WO2015/068824
PCT Pub. Date: May 14, 2015

(65) Prior Publication Data
US 2016/0250695 A1    Sep. 1, 2016

(30) Foreign Application Priority Data
Nov. 8, 2013  (JP) .................................. 2013-232286

(51) Int. Cl.
*B23C 5/14*    (2006.01)
*B23C 5/10*    (2006.01)
(Continued)

(52) U.S. Cl.
CPC .................. *B23C 5/10* (2013.01); *B23C 3/28* (2013.01); *B23C 3/30* (2013.01); *B23C 5/1009* (2013.01);
(Continued)

(58) Field of Classification Search
CPC ....... B23C 5/10; B23C 5/1009; B23C 5/1018; B23C 2200/36; B23C 2210/08;
(Continued)

(56) References Cited

U.S. PATENT DOCUMENTS 4,850,761 A * 7/1989 Breuer ...................... B23C 3/00
409/132
2004/0120777 A1 6/2004 Noland
(Continued)

FOREIGN PATENT DOCUMENTS

EP    2 383 060 A1    11/2011
JP    2006-212744    8/2006
(Continued)

OTHER PUBLICATIONS

International Search Report dated Jan. 27, 2015, in corresponding International Application No. PCT/JP2014/079652.
(Continued)

*Primary Examiner* — Daniel Howell
*Assistant Examiner* — Yasir Diab

(57) ABSTRACT

Radius mill and cutting work method that includes a plurality of end cutting edges arrayed around a central axis O and a plurality of arc-shaped radius end cutting edges continuous with the end cutting edges on an outer peripheral side in a radial direction. The end cutting edge is divided into an inner peripheral side end cutting edge and an outer peripheral side end cutting edge in a radial direction. Second surfaces of the plurality of inner peripheral side end cutting edges are coupled at a part close to the axis O. A region of coupled second surfaces is continuous from a region including the axis O to outer peripheral sides of respective inner peripheral side end cutting edges in a radial direction in a
(Continued)

strip shape. A width of the strip-shaped region gradually enlarges from axis O side to an outer peripheral side in a radial direction.

20 Claims, 7 Drawing Sheets

(51) Int. Cl.
B23C 3/28 (2006.01)
B23C 3/30 (2006.01)

(52) U.S. Cl.
CPC ........ *B23C 5/1018* (2013.01); *B23C 2200/36* (2013.01); *B23C 2210/08* (2013.01); *B23C 2210/084* (2013.01); *B23C 2210/126* (2013.01); *B23C 2210/54* (2013.01); *B23C 2222/28* (2013.01)

(58) Field of Classification Search
CPC ........ B23C 2210/084; B23C 2210/082; B23C 3/28; B23C 3/30; Y10T 409/303752; Y10T 409/303808
See application file for complete search history.

(56) References Cited

U.S. PATENT DOCUMENTS

| 2004/0170480 A1* | 9/2004 | Kawai ...................... B23C 5/10 407/53 |
| 2007/0258777 A1 | 11/2007 | Gunther et al. |
| 2009/0060663 A1* | 3/2009 | Rouge ...................... B23C 5/10 407/44 |
| 2010/0143052 A1* | 6/2010 | Aoki ........................ B23C 5/10 407/54 |
| 2011/0268513 A1* | 11/2011 | Takagi ...................... B23C 5/10 407/54 |
| 2014/0205390 A1* | 7/2014 | Baba ........................ B23C 5/10 407/54 |

FOREIGN PATENT DOCUMENTS

| JP | 2011-20192 | 2/2011 |
| JP | 2012-157957 | 8/2012 |
| JP | 5088678 | 12/2012 |
| WO | WO 2012/172710 A1 | 12/2012 |

OTHER PUBLICATIONS

Extended European Search Report dated Mar. 8, 2017 in corresponding European Patent Application No. 14859816.2.

* cited by examiner

"Prior Art"

"Prior Art"

"Prior Art"

RADIUS END MILL AND CUTTING WORK METHOD

CROSS-REFERENCE TO RELATED APPLICATIONS

This application is a U.S. National Stage Application, which claims the benefit under 35 U.S.C. § 371 of PCT International Patent Application No. PCT/JP2014/079652, filed Nov. 8, 2014, which claims the foreign priority benefit under 35 U.S.C. § 119 of Japanese Patent Application No. 2013-232286, filed Nov. 8, 2013, the contents of which are incorporated herein by reference.

TECHNICAL FIELD

The present invention relates to a radius end mill used for a two-dimensional process, a three-dimensional process, and a similar process on molds and a cutting work method using the radius end mill.

BACKGROUND ART

A mold such as a mold for plastic molding is practically formed with a tool steel (quenching and tempering steel, HRC of around 50 to 55). For highly efficient cutting work on a mold of this type, a radius end mill that couples end cutting edges and peripheral cutting edges with arc-shaped corner cutting edges has been heavily used. Since the radius end mill has the arc-shaped corner cutting edges, compared with other end mills (for example, a square end mill), the cutting edges involving cutting lengthen. Moreover, the maximum amount of cutout by each cutting edge is decreased. This is advantageous in that a cutting resistance of each cutting edge is small. Consequently, this ensures the improved machining efficiency by, for example, setting a fast feed speed, ensuing a long tool service life.

However, cutting work with the radius end mill lengthens the cutting edges contributing to the cutting; therefore, chatter vibrations are likely to occur. Especially, increasing the feed speed and a notch makes this tendency remarkable. Consequently, in addition to a reduction in the tool service life, this brings a significant problem such as a deterioration of roughness of a processed surface. Therefore, to improve the roughness of the processed surface (a grade of the processed surface), Patent Documents 1 and 2 have proposed the following.

As illustrated in FIG. 6(a) and FIG. 6(b), with the radius end mill in Patent Document 1, a back tapered peripheral cutting edge 111 is smoothly coupled to an outer peripheral side boundary 103a of an arc cutting edge 103, which is disposed at an end cutting edge of a tool body 102. The peripheral cutting edge 111 is formed into an arc from a boundary with the arc cutting edge 103 along a common tangent line L1. The radius end mill includes a face 104 on a front side of each arc cutting edge 103 in a rotation direction. A swarf discharging groove 105 is formed on the front side including the face 104 in the rotation direction. The swarf discharging groove 105 is excised into an approximately V shape in a central axis line O direction in a horizontally cross-sectional view. On the rear side of the arc cutting edge 103 in the rotation direction, a primary flank 107, which has a positive clearance angle, and a secondary flank 108, which has a clearance angle larger than the positive clearance angle, are continuously disposed. At an other (the central axis line O side) boundary 103b on each arc cutting edge 103, a linear-shaped first end cutting edge 112 and a second end cutting edge 113 are disposed consecutively inclined to a base portion side of the tool body 102. The first end cutting edges 112 and the second end cutting edges 113 intersect with one another at a chisel 114, which is disposed on the central axis line O.

According to a radius end mill 101 in Patent Document 1, a radius of the peripheral cutting edge 111 is configured larger than a radius of the arc cutting edge 103 (configured at a dimension twice to ten times as large as a radius of the tool body). The arc cutting edge 103 couples the first end cutting edge 112 at a boundary on the opposite side from the peripheral cutting edge 111 at a clearance angle of 0.5° to 5°. To the first end cutting edge 112, the second end cutting edge 113 is coupled providing a larger clearance angle of 7° to 15°. This leads to smooth cutting at an outer peripheral side boundary 103a between the arc cutting edge 103 and the peripheral cutting edge 111, restraining chatter vibrations and providing good surface roughness. Further, the clearance angle of the first end cutting edge 112 reduces a cutting load on a bottom surface of workpiece, restraining the chatter vibrations and providing good finishing of the processed surface.

A radius end mill in Patent Document 2 is a long neck radius end mill with a cutting diameter of 6 mm or less and an under-neck length three times or more of the cutting diameter. As illustrated in FIG. 7(a) and FIG. 7(b), the cutting part has a plurality of peripheral cutting edges 16, radius end cutting edges 17, and end cutting edges 18. The end cutting edge 18 includes an outer peripheral side end cutting edge 19, which is coupled to the radius end cutting edge 17, and an inner peripheral side end cutting edge 110, which is coupled to the outer peripheral side end cutting edge 19 and heads for a center direction of the tool. With this long neck radius end mill, the radius end cutting edge 17 is smoothly coupled to the outer peripheral side end cutting edge 19. Therefore, the radius end cutting edge 17 is slightly extended to the inner peripheral side and is smoothly coupled such that a tangent line of the radius end cutting edge 17 at a final point of the extension becomes the outer peripheral side end cutting edge 19. Thus, as illustrated in FIG. 7(a), for smooth coupling between the radius end cutting edge 17 and the outer peripheral side end cutting edge 19 at the junction, Patent Document 2 configures a concave angle θ1 of the outer peripheral side end cutting edge 19 and a concave angle θ2 of the inner peripheral side end cutting edge 110 within a specified range.

As illustrated in FIG. 7(b), designing a length Lc of the outer peripheral side end cutting edge 19 within a specified range ensures reliable cutting and removal of an uncut part even in the case of a large feed amount of one cutting edge. Further, the outer peripheral side end cutting edge 19 of the end cutting edge 18 is inclined to a rear side with respect to the inner peripheral side end cutting edge 10 in the rotation direction at a predetermined angle θ3. This restrains the chatter vibrations in the long neck radius end mill, preventing deterioration of roughness of the processed surface.

CITATION LIST

Patent Documents

Patent Document 1: Japanese Unexamined Patent Application Publication No. 2006-212744
Patent Document 2: Japanese Patent No. 5088678

DISCLOSURE OF THE INVENTION

Problems to be Solved by the Invention

The radius end mill in Patent Document 1 shows the example in the case of the number of cutting edges of two; however, when the distal end portion of the tool body is viewed from the end surface side, widths of flanks (second surfaces) of the end cutting edges 112 and 113 are uniform in the radial direction (see FIG. 6(b)). Therefore, the outer peripheral side in the radial direction is relatively likely to be a weak point with respect to a resistance (a bending moment) that the end cutting edges 112 and 113 receive when a work material is cut. The bending moment during cutting increases according to a distance from the central axis O. However, in the case of uniform widths of the flanks of the end cutting edges, cross-sectional areas in the rotation direction (the circumferential direction) resisting the bending moment are also uniform in the radial direction. Therefore, bending stress intensity increases as approaching to the outer periphery in the radial direction, and this is relatively likely to lead to the damage. With the uniform widths of the flanks of the end cutting edges, the larger number of cutting edges makes it difficult to sufficiently ensure a width of a gash, which is formed between the adjacent end cutting edges, in the rotation direction.

With the long neck radius end mill in Patent Document 2, the flanks of the respective inner peripheral side end cutting edges are not coupled at the center of the tool (see (FIG. 7(b)). This fails to sufficiently meet extremely severe requests in a machining field where a highly accurately (submicron or less) finishing surface is requested such as the recent mold for plastic molding; therefore, further improvement is necessary.

Considering the above-described backgrounds, an object of the present invention is to provide a radius end mill and a cutting work method that feature high safety against a damage to end cutting edges during cutting, ensure highly efficient cutting work, and ensure obtaining highly accurate finishing surface roughness.

Solutions to the Problems

A radius end mill of the present invention to achieve the object is the following radius end mill. The radius end mill includes a cutting edge portion disposed on a distal end portion of a tool body. The cutting edge portion includes a plurality of end cutting edges arrayed around a central axis, a plurality of arc-shaped radius end cutting edges continuous with the end cutting edges on an outer peripheral side in a radial direction, and a plurality of peripheral cutting edges continuous with the radius end cutting edges on an outer peripheral side in a radial direction. The peripheral cutting edges are disposed to extend to a rear end portion side of the tool body along cutting edge grooves. The end cutting edge is divided into an inner peripheral side end cutting edge and an outer peripheral side end cutting edge in a radial direction. The radius end cutting edge has a shape such that a lowest point of the radius end cutting edge during cutting with the tool body is positioned in a section from a boundary between the outer peripheral side end cutting edge and the radius end cutting edge to a boundary between the radius end cutting edge and the peripheral cutting edge. Second surfaces of the plurality of inner peripheral side end cutting edges are coupled to one another at a part close to the central axis. When a distal end portion of the tool body is viewed from an end surface side, a region of coupled second surfaces of the plurality of inner peripheral side end cutting edges is continuous from a region including the central axis to outer peripheral sides of respective inner peripheral side end cutting edges in a radial direction in a strip shape. A width of the strip-shaped region gradually enlarges from the central axis side to an outer peripheral side in a radial direction. End portions of all the inner peripheral side end cutting edges close to the central axis intersect with the boundary lines between the second surfaces of the inner peripheral side end cutting edges positioned on front sides of the inner peripheral side end cutting edges in a rotation direction and gashes formed on rear sides in the rotation direction at positions on an outer peripheral side with respect to the central axis O in a radial direction.

"The end cutting edge is divided into an inner peripheral side end cutting edge and an outer peripheral side end cutting edge in a radial direction." means that the second surface of the end cutting edge, which is the flank formed on the rear side of the end cutting edge in the rotation direction, is divided into the second surface on the inner peripheral side and the second surface on the outer peripheral side in the radial direction. However, the boundary between the inner peripheral side end cutting edge and the outer peripheral side end cutting edge is not necessarily to be always the point having the convex angle on the front surface side of the tool body (the radius end mill) like a polygonal line. The boundary between the second surface of the inner peripheral side and the second surface of the outer peripheral side does not always appear as the clear boundary line like the convex ridgeline.

"The end cutting edge is divided into an inner peripheral side end cutting edge and an outer peripheral side end cutting edge in a radial direction." is also related to grinding work with a grindstone, which forms the radius end cutting edges and the end cutting edges at the cutting edge portion. Assume the case where, when the cutting edges are ground such that the second surfaces of the plurality of inner peripheral side end cutting edges are coupled to one another to form the continuous surface, as described in claim 1, the second surfaces are formed such that the distance between the end cutting edges adjacent in the rotation direction is smaller as approaching to the central axis. Then, it is difficult to use the grindstone used for grinding the radius end cutting edges and the outer peripheral side end cutting edges without change for the grinding of the inner peripheral side end cutting edges close to the central axis. Therefore, when the inner peripheral side end cutting edges close to the central axis are ground, using a grindstone that has a shape or a size not causing an interference with the adjacent end cutting edges is necessary. Because of this circumstance, the end cutting edge is divided into the inner peripheral side end cutting edge and the outer peripheral side end cutting edge in the radial direction.

That is, "The end cutting edge is divided into an inner peripheral side end cutting edge and an outer peripheral side end cutting edge" occurs as a result of achieving the object of forming the second surfaces as follows. The second surfaces of the plurality of inner peripheral side end cutting edges form the surface coupled at the part close to the central axis. Then, the more the distance between the adjacent end cutting edges is close to the central axis, the smaller the distance is (The width of the strip-shaped region gradually enlarges from the central axis side to the outer peripheral side in the radial direction). Accordingly, "The end cutting edge is divided in a radial direction." means that the plurality of second surfaces are formed into the continuous surface and the width of the strip-shaped region enlarges as approaching to the outer peripheral side in the radial direction.

"Second surfaces of the plurality of inner peripheral side end cutting edges are coupled to one another at a part close to the central axis" means that the second surfaces (the flanks) of the plurality of inner peripheral side end cutting edges do not form separated surfaces. Specifically, as illustrated in FIG. 1 and FIG. 3-(a), this means that the end portions of all the inner peripheral side end cutting edges 4 close to the central axis O intersect with the boundary lines between second surfaces 40 of the inner peripheral side end cutting edges 4, which are positioned on the front sides of the inner peripheral side end cutting edges 4 in the rotation direction, and the gashes 8 (gash wall surfaces 80), which are formed on the rear sides in the rotation direction, at positions on the outer peripheral side with respect to the central axis O in the radial direction. The surface of the plurality of coupled second surfaces 40 itself forms, for example, the continuous surface or a surface like a polyhedron. The "continuous surface" is, for example, a curved surface whose curvature is uniform or whose curvature continuously changes, or is a surface whose curvature changes little by little. The surface mainly forms the curved surface but includes a plane in some cases. The polyhedron includes a surface whose curvature changes but also includes concavities and convexities generated by the grinding process on the second surface 40 with the grindstone.

Coupling the second surfaces 40 of the plurality of inner peripheral side end cutting edges 4 to one another is likely to disperse and transmit the vibrations occurred in the respective inner peripheral side end cutting edges 4 during cutting to all the inner peripheral side end cutting edges 4. Accordingly, the vibrations are less likely to occur individually in the inner peripheral side end cutting edges 4. The coupling uniforms the rigidity of the respective cutting edges 2, making the resistance occurred in the respective cutting edges 2 during cutting uniform. Therefore, the chatter vibrations are less likely to occur in the tool body during cutting. This easily produces a high-quality processed surface on the work material.

"Second surfaces of the plurality of inner peripheral side end cutting edges are coupled at a part close to the central axis" means, in other words, as illustrated in FIG. 1, when the distal end portion of the tool body 30 is viewed from the end surface side, the region of the coupled second surfaces 40 of the plurality of inner peripheral side end cutting edges 4 is continuous from the region including the central axis O to the outer peripheral sides of the respective inner peripheral side end cutting edges 4 in the radial direction in the strip shape.

This gradual enlargement of the widths of the strip-shaped regions from the central axis O side to the outer peripheral sides in the radial direction ensures the following. The parts of the tool body 30 up to the cutting edge grooves 9 on the rear side in the rotation direction including the second surfaces 40 of the respective inner peripheral side end cutting edges 4 generates the bending moment caused by the resistance during cutting equally at any part in the radial direction.

When the inner peripheral side end cutting edges 4 cut a work material W, the bending moment acts on the respective portions of the inner peripheral side end cutting edges 4 in the radial direction according to the distance from the central axis O, which is the rotational center. The parts of the tool body 30 including the second surfaces 40 of the inner peripheral side end cutting edges 4 up to the cutting edge grooves 9 on the rear side in the rotation direction resists the bending moment. Here, the second surfaces 40 have the shape of gradually enlarging from the central axis O side to the outer peripheral sides in the radial direction. Accordingly, the cross-sectional area of the part resisting the bending moment during cutting gradually increases from the central axis side to the outer peripheral side in the radial direction. This is likely to uniform the bending stress intensity (the bending moment/section modulus) occurred in the parts of the inner peripheral side end cutting edges 4 close to the central axis O in the radial direction and the bending stress intensity occurred in the parts close to the outer periphery in the radial direction. Thus, the resistance against the bending moment is uniform among the respective portions in the radial direction. Accordingly, any part of the inner peripheral side end cutting edges 4 in the radial direction is less likely to be a weak point relatively, improving safety against damage to the inner peripheral side end cutting edges 4.

In the region of the coupled second surfaces 40, the width of the strip-shaped region extending from the center part gradually enlarges from the central axis O side to the outer peripheral side in the radial direction. Therefore, even if the number of cutting edges is increased, such as eight, this configuration ensures sufficiently ensuring the width of the gash 8 formed between the adjacent end cutting edges 3 and 3 in the rotation direction.

As illustrated in FIG. 5, a lowest point Pb of the radius end cutting edge 6 when the tool body 30 (the radius end mill 1) is in a cutting state is positioned in a section from a boundary (a coupling portion) P2 between the outer peripheral side end cutting edge 5 and the radius end cutting edge 6 and a boundary (a coupling portion) P4 between the radius end cutting edge 6 and the peripheral cutting edge 7. With the lowest point Pb of the radius end cutting edge 6 in this state, even if the radius end cutting edges 6 cut the work material W with the central axis O of the tool body 30 inclined with respect to the thickness direction of the work material W, this ensures avoiding the boundary P2 between the outer peripheral side end cutting edge 5 and the radius end cutting edge 6 to be brought in contact with the work material W during cutting. This ensures forming a good processed surface on the work material W. "[A] lowest point Pb of the radius end cutting edge 6 when the tool body 30 is in a cutting state (during cutting with the tool body 30)" is the lowest point Pb of the radius end cutting edge 6 when the distal end portion is faced down and the tool body 30 is viewed from the side surface. "[T]he distal end portion of the tool body 30 is faced down" means that the central axis O of the tool body 30 is faced to the thickness direction (the height direction) of the work material.

If the angle of the central axis O with respect to the thickness direction of the work material W may change while the radius end cutting edges 6 cut the work material W with the central axis O of the tool body 30 inclined with respect to the thickness direction of the work material W, it is appropriate that the section from the boundary P2 between the radius end cutting edge 6 and the outer peripheral side end cutting edge 5 and the boundary P4 between the radius end cutting edge 6 and the peripheral cutting edge 7 has a constant curvature radius R.

The constant curvature radius R of the radius end cutting edge 6 makes the distance from a center of curvature OR of the section from the boundary P2 to the boundary P4, which is illustrated in FIG. 5, to any point of the radius end cutting edge 6 constant. Therefore, even if the inclination angle of the central axis O of the tool body 30 changes and the cutting parts of radius end cutting edges 6 change in the circumferential direction of the radius end cutting edges 6, this configuration ensures obtaining a state where the cutting is always performed at a part (a section) spacing the constant distance from the center of curvature OR avoiding the boundary P2, which possibly becomes discontinuous points on the cutting edge 2, to be brought into contact with the work material W. The absence of the discontinuous points in the section of the cutting edge 2 involving cutting avoids providing cutting scratch or a similar damage due to the discontinuous points to the work material W. Therefore, even if the cutting speed is increased to improve machining efficiency, the chatter vibrations of the tool body 30 is restrained, ensuring obtaining the highly accurate processed surface roughness on the work material W.

Meanwhile, as illustrated in FIG. 3-(a), when an intersection point U (P2) of a boundary (a boundary line) SR between the second surface 60 of the radius end cutting edge 6 and a second surface 50 of the outer peripheral side end cutting edge 5 and the outer peripheral side end cutting edge 5 is at a position different from an intersection point V of a boundary (a boundary line) T between a face 62 of the radius end cutting edge 6 and a face 31 of the end cutting edge 3 and the outer peripheral side end cutting edge 5 or the radius end cutting edge 6 (claim 2), this is advantageous in that safety against damage to the radius end mill (the tool body) caused by the resistance during cutting is enhanced. The intersection point U (P2) is also the boundary between the outer peripheral side end cutting edge 5 and the radius end cutting edge 6.

Assume that, for example, in FIG. 3-(a), the intersection point U of the outer peripheral side end cutting edge 5 and the radius end cutting edge 6 is not a point on the consecutive ridgeline (the curved line) but is a discontinuous point convexed on the front surface side. As illustrated in FIG. 3-(c), if the intersection point V matches the intersection point U, the resistance during cutting is likely to concentrate on the intersection point U (V). This is likely to damage a part near the intersection point U, possibly resulting in unstable cutting work with the radius end mill 1.

In contrast to this, as illustrated in FIGS. 3-(a) and (b), in the case where the intersection point U and the intersection point V are displaced in the radial direction and therefore at different positions, the resistance during cutting attempts to decentrally act on the intersection point U and the intersection point V. This reduces a possibility of damaging parts near the intersection point U and near the intersection point V, leading to improvement of stability of the cutting work with the radius end mill 1. Since the intersection point U is the boundary between the outer peripheral side end cutting edge 5 and the radius end cutting edge 6, "the intersection point U and the intersection point V are displaced in the radial direction" means a case where the intersection point V, which is the point where the boundary T between both faces 62 and 31 intersects with the cutting edge 2, is positioned on the outer peripheral side end cutting edge 5 (FIG. 3) and a case where the intersection point V is positioned on the radius end cutting edge 6. FIG. 3-(a) illustrates the case where the intersection point V is close to the intersection point U (P2). FIG. 3-(b) illustrates the case where the intersection point U is close to a boundary P1 between the inner peripheral side end cutting edge 4 and the outer peripheral side end cutting edge 5.

Especially, as illustrated in FIGS. 3-(a) and (b), when the intersection point U (P2) of the boundary SR between the second surface 60 of the radius end cutting edge 6 and the second surface 50 of the outer peripheral side end cutting edge 5 and the outer peripheral side end cutting edge 5 is positioned on an outer peripheral side in a radial direction with respect to an intersection point V of the boundary T between the face 62 of the radius end cutting edge 6 and a face 31 of the end cutting edge 3 with the outer peripheral side end cutting edge 5 (claim 3), with the comparison of the case where the intersection point U matches the intersection point V, this ensures widely ensuring the area of the face 62 of the radius end cutting edge 6, allowing the swarf to easily flow in a constant direction. Consequently, an influence of interference by the swarf to the work material is decreased. This ensures improving the processed surface accuracy of the work material W. As illustrated in FIG. 3-(b), the area of the face 62 of the radius end cutting edge 6 enlarges as the intersection point V approaches the boundary P1, improving a discharge property of swarf.

When the distal end portion of the tool body 30 is viewed from an end surface side, the plurality of end cutting edges 3 are equally arrayed in a rotation direction (a circumferential direction) of a tool body 30 around a central axis O (claim 4), the chatter vibrations of the tool body 30 are restrained, obtaining an effect of good grade of the processed surface on the work material. This is because of the following reason. In the case where the plurality of end cutting edges 3 are not equally arrayed around the central axis O, the amount of cutout and a cutting depth may differ depending on each end cutting edge 3, and the resistance received by each end cutting edge 3 also may differ. This is likely to cause the chatter vibrations and therefore the grade of the processed surface on the work material is likely to deteriorate. However, when the end cutting edges 3 are equally arrayed, the amount of cutout and a similar specification of the respective end cutting edges 3 are less likely to be different.

With the radius end mill 1 of the present invention, a curvature radius R of the radius end cutting edge 6 is preferably in a range of 1% to 30% of a cutting diameter D (claim 5). The curvature radius R of less than 1% of the cutting diameter D is likely to generate a chipping due to insufficient edge strength while the curvature radius R of more than 30% of the cutting diameter D makes it difficult to form the end cutting edge 3.

In terms of practical use of the radius end mill 1, a count of the end cutting edges 3 (the cutting edges 2) is two to eight (preferably three to eight). At least a base constituting a cutting edge 2 is preferably made of a WC-based cemented carbide alloy (claim 6). Further, in terms of machining accuracy, the entire tool is preferably an integrated solid end mill formed of a base made of a WC-based cemented carbide alloy. The reason that the three or more end cutting edges 3 is preferable is as follows. The coupled second surfaces 40 of the plurality of inner peripheral side end cutting edges 4 have a shape being equally dispersed in the rotation direction of the tool body 30. This increases stability of the tool body 30 during cutting. Additionally, the increase in the number of flutes to more than two ensures the increased feed speed of the tool body 30, thus ensuring highly efficient processing.

With the radius end mill according to any one of claim 1 to claim 6, in the case where, in the radius end cutting edges 6, a section from a boundary P2 between the outer peripheral side end cutting edge 5 and the radius end cutting edge 6 to a boundary P4 between the radius end cutting edge 6 and the peripheral cutting edge 7 has a constant curvature radius, the present invention is appropriate for cutting work that configures an axial notch on a work material on which a pocket-shaped groove is formed, and contour machining is performed on the groove. Then, meeting the following conditional expressions (1) and (2) is preferable (claim 7).

$$ap \leq R/20 \quad \text{Expression (1):}$$

ap: axial notch
R: curvature radius of a radius end cutting edge $$Lw < LR < R \quad \text{Expression (2):}$$

Lw: $(R^2 - Lz^2)^{1/2}$
LR: length from a boundary between an outer peripheral side end cutting edge and a radius end cutting edge to a lowest point of a radius end cutting edge
Lz: (R−ap)

When the above-described two expressions are met, the following has been confirmed by experiments. As illustrated in FIG. 5, when the constant curvature is provided to the radius end cutting edge 6, this allows only the arc cutting edge in the radius end cutting edge 6 to be brought in contact which the work material W. Therefore, this does not generate a scratch due to a contact or similar of the above-described boundary P2 (the intersection point U), which possibly becomes the discontinuous points on the cutting edge 2 to the work material W. This ensures obtaining the high-quality processed surface on the work material W. "[A] section from a boundary P2 between the outer peripheral side end cutting edge 5 and the radius end cutting edge 6 to a boundary P4 between the radius end cutting edge 6 and the peripheral cutting edge 7 has a constant curvature radius R" is meaningful in the following point. As describe above, if the angle of the central axis O with respect to the thickness direction of the work material W changes while the radius end cutting edges 6 cut the work material W with the central axis O of the tool body 30 inclined with respect to the thickness direction of the work material W, the configuration obtains the state where the boundary P2 is not in contact with the work material W and the radius end cutting edges 6 cut the work material W by the part at which the curvature radius R is always constant.

Expression (1) is especially preferable to meet ap≤R/20 and R/50≤ap≤R/20. Meeting R/30≤ap≤R/20 is further preferable. Because, the more ap goes outside the specific range of Expression (1), the worse the processed surface roughness is. Meeting the relationship of Expression (2): Lw<LR<R is meaningful to avoid a scratch due to the contact of the boundary P2 to the work material W or a similar error, ensuring obtaining the good processed surface roughness.

Effects of the Invention

With the radius end mill of the present invention, the flanks of all the inner peripheral side end cutting edges are coupled to one another on the center side of the tool. The region of the coupled second surfaces is continuous from the region including the central axis to the outer peripheral sides of the respective inner peripheral side end cutting edges in the radial direction in the strip shape. The width of the strip-shaped region gradually enlarges to the outer peripheral side in the radial direction. Therefore, the parts of the respective inner peripheral side end cutting edges including the second surfaces ensure generating the bending moment caused by the resistance during cutting equally at any part in the radial direction. Accordingly, any part of the inner peripheral side end cutting edge in the radial direction is less likely to be a weak point relatively. Accordingly, safety against the damage to the inner peripheral side end cutting edge is improved.

By coupling the second surfaces of the respective inner peripheral side end cutting edges to one another at the part close to the central axis, the vibrations during cutting generated in the respective inner peripheral side end cutting edges are likely to be dispersed to all the inner peripheral side end cutting edges. Accordingly, the vibrations are less likely to occur individually in the inner peripheral side end cutting edges. This is less likely to cause the chatter vibrations in the tool body during cutting, and the high-quality processed surface is easily produced on the work material. Consequently, the finishing surface roughness of submicron or less can be obtained. This is preferable for cutting work of workpiece where extremely highly accurate finishing surface roughness (for example, a mirror finish) is required such as a mold for plastic molding.

Additionally, the lowest point of the radius end cutting edge when the distal end portion is faced down and the tool body is viewed from the side surface is positioned in the section from the boundary between the outer peripheral side end cutting edge and the radius end cutting edge to the boundary between the radius end cutting edge and the peripheral cutting edge. This avoids the boundary between the outer peripheral side end cutting edge and the radius end cutting edge to be brought into contact with the work material during cutting. Accordingly, forming the good processed surface on the work material is possible.

According to the cutting work method of the present invention, when the constant curvature is provided to the radius end cutting edge, this ensures performing the finishing process on the pocket portion by the contour machining while only the arc cutting edge of the radius end cutting edge is brought in contact with the work material. Accordingly, the extremely highly accurate finishing surface roughness is obtained. Simultaneously, the cutting resistance of the distal end portion of the radius end cutting edge is reduced. Accordingly, even if high speed cutting work is performed, the tool service life can be lengthened.

BRIEF DESCRIPTION OF THE DRAWINGS

FIG. 3(*b*) is a perspective view illustrating states of a cutting edge and a face when an intersection point V of a boundary between the face of a radius end cutting edge and a face of an end cutting edge and an outer peripheral side end cutting edge is close to a boundary P1 between the inner peripheral side end cutting edge and the outer peripheral side end cutting edge.

FIG. 3(*c*) is a perspective view illustrating states of the cutting edge and the face when the intersection point V of the boundary between the face of the radius end cutting edge and the face of the end cutting edge and the outer peripheral side end cutting edge match the boundary P2 (an intersection point U) between the outer peripheral side end cutting edge and the radius end cutting edge.

DESCRIPTION OF PREFERRED EMBODIMENTS

Figure 1:
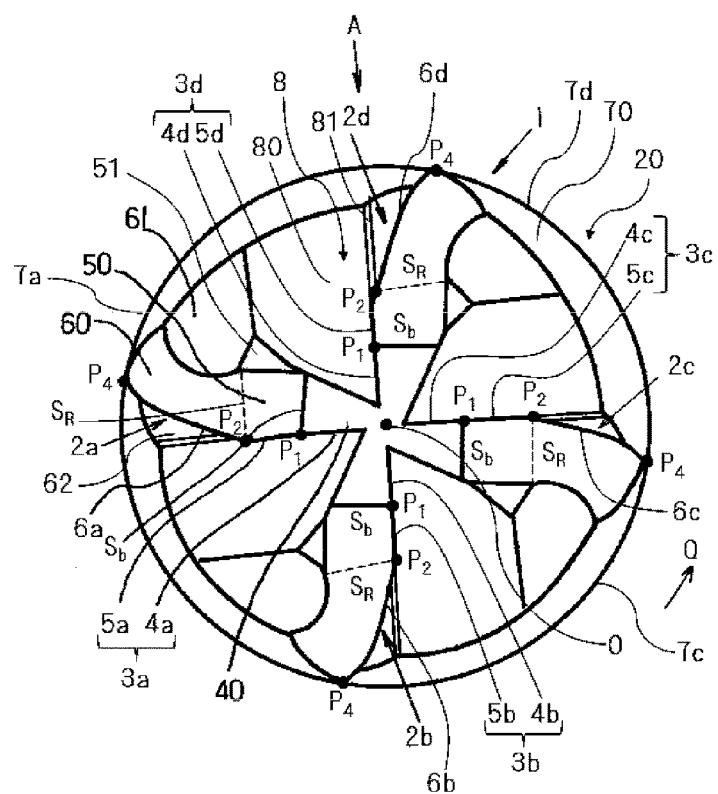
FIG. 1 is a front view illustrating a manufacturing example of a radius end mill when a cutting edge portion of a tool body is viewed from a distal end side.
Figure 2:
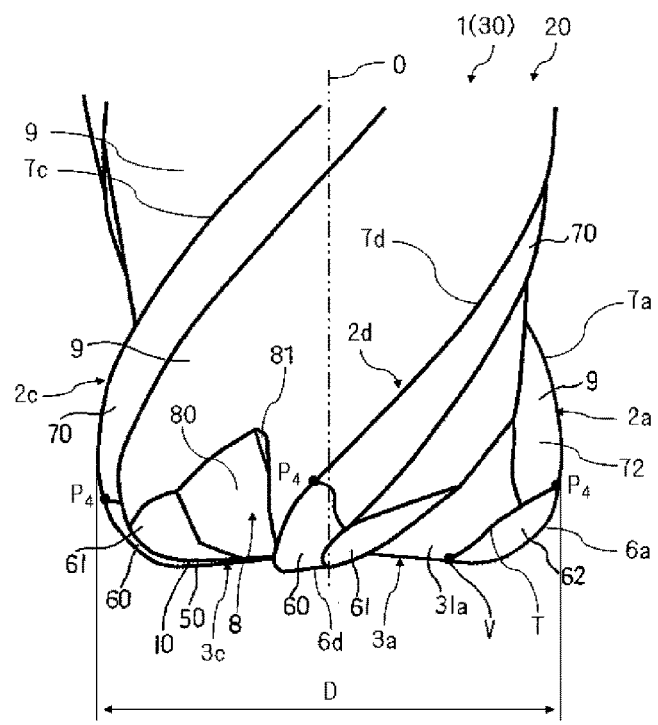
FIG. 2 is a side view of the radius end mill in FIG. 1 viewed from a direction A.

The following describes a radius end mill 1 of the present invention in detail with reference to the drawings. FIG. 1 is illustrates a state of a cutting edge portion 20 of the radius end mill 1 of the present invention viewed from a distal end side of a tool body 30. FIG. 2 illustrates a state of the radius end mill 1 in FIG. 1 viewed from a direction A. As illustrated in FIG. 1 and FIG. 2, when a distal end portion of the tool body 30 is viewed from an end surface side, the radius end mill 1 includes a plurality of end cutting edges 3, a plurality of arc-shaped radius end cutting edges 6, and a plurality of peripheral cutting edges 7. The end cutting edge 3 are arrayed around a central axis O of the tool body 30. The radius end cutting edges 6 are continuous with (coupled to) outer peripheral sides of the end cutting edges 3 in the radial direction. The peripheral cutting edges 7 are continuous with (coupled to) the outer peripheral sides of the radius end cutting edges 6 in the radial direction. The peripheral cutting edge 7 is disposed to extend to a rear end portion (a shank (not illustrated)) side of the tool body 30 along a cutting edge groove 9. For example, a solid type radius end mill where the entire tool body 30 is integrally formed is configured. In FIG. 1, Q indicates a rotation direction of the tool. The drawing illustrates the example of the radius end mill 1 with four cutting edges; however, the number of cutting edges 2 is not limited to four.

The cutting edge portion 20 is constituted of the plurality of cutting edges 2, in the drawing, four cutting edges 2a to 2d. The cutting edges 2a to 2d each start from positions spaced from the central axis O in the radial direction. The cutting edges 2a to 2d include four end cutting edge 3a to 3d, four radius end cutting edges 6a to 6d, and four peripheral cutting edges 7a to 7d (FIG. 2 illustrates only the peripheral cutting edges 7a, 7c, and 7d). The end cutting edges 3a to 3d are spaced from one another in the rotation direction of the tool body 30. The radius end cutting edges 6a to 6d are continuous with (coupled to) the outer peripheral sides of the respective end cutting edges 3a to 3d in the radial direction. The peripheral cutting edges 7a to 7d are continuous with (coupled to) the outer peripheral sides of the respective radius end cutting edges 6a to 6d in the radial direction. While the respective peripheral cutting edges 7a to 7d are inclined with respect to the central axis O by a predetermined angle, the peripheral cutting edges 7a to 7d are disposed to extend from the outer peripheral side at the distal end portion of the tool body 30 to the rear end portion side of the tool body 30. At parts near outer peripheral side corners at the distal end portion of the tool body 30, the respective peripheral cutting edges 7a to 7d are continuous with (coupled to) the four radius end cutting edges 6a to 6d.

The respective peripheral cutting edges 7a to 7d are right hand cuts and right hand helical teeth. Twisted angles of the peripheral cutting edges 7a to 7d are, for example, set in a range of 15° to 60°. The example illustrated in the drawing uses the radius end mill 1 with four cutting edges. With a comparison with a radius end mill with more than four cutting edges, since a cross-sectional area of the cutting part including the respective cutting edges 2a to 2d and the second surfaces (the flanks), which are formed on the rear sides of the cutting edges 2a to 2d in the rotation direction, is large, this is advantageous in that highly accurate finishing surface roughness can be obtained.

As illustrated in FIG. 2, the respective end cutting edges 3a to 3d are formed at an equal length up to near the central axis O. The end cutting edges 3a to 3d are inclined to the rear end side of the tool body 30 as approaching to the central axis O. When the tool body 30 is viewed from the end surface side, the end cutting edges 3a to 3d are each divided into inner peripheral side end cutting edges 4a to 4d, which are close to the central axis O in the radial direction, and outer peripheral side end cutting edges 5a to 5d, which are close to the outer periphery side. Boundaries P1 are boundaries between the inner peripheral side end cutting edges 4a to 4d and the outer peripheral side end cutting edges 5a to 5d. Boundaries (boundary lines) Sb partition second surfaces 40 of the inner peripheral side end cutting edges as flanks, which are formed on the rear sides of the inner peripheral side end cutting edges 4a to 4d in the rotation direction, and second surfaces 50 of the outer peripheral side end cutting edges as flanks, which are formed on the rear sides of the outer peripheral side end cutting edge 5a to 5d in the rotation direction, in the radial direction. The boundary P1 is an end portion of the boundary Sb on the front side in the rotation direction. The boundary P1 and the boundary Sb clearly appear as convex points or as convex ridgelines on a front surface side of the tool body 30 or do not appear.

Figure 5:
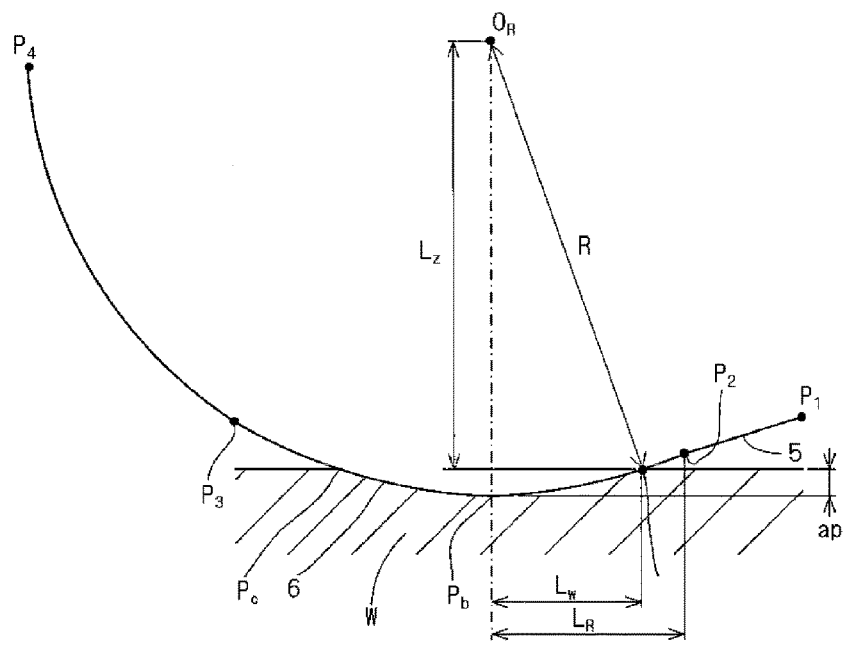
FIG. 5 is an enlarged figure of the part B in FIG. 4 for description of a cutting work method of the present invention.
Figure 6A:
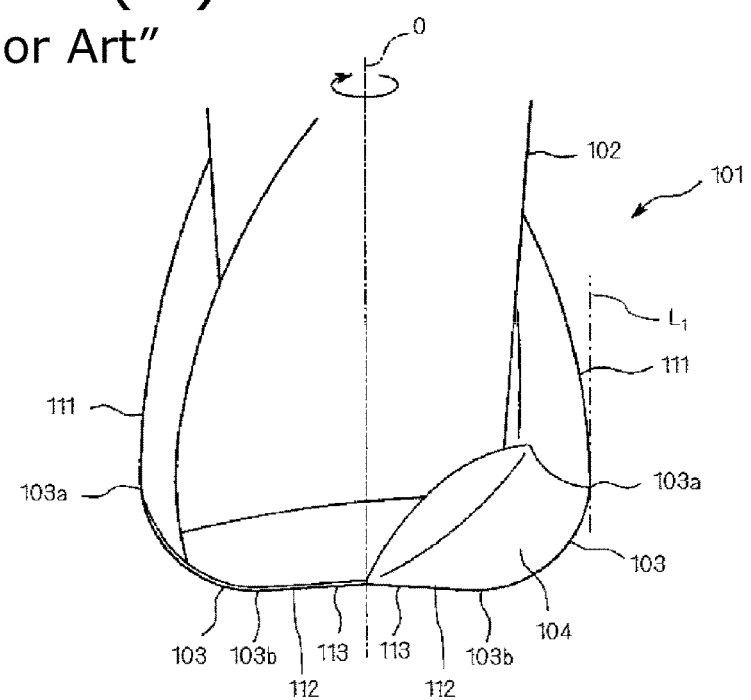
FIG. 6(*a*) is a side view illustrating a distal end portion of a radius end mill in Patent Document 1.
FIG. 6(b) is a bottom view of the radius end mill in Patent Document 1.
Figure 6B:
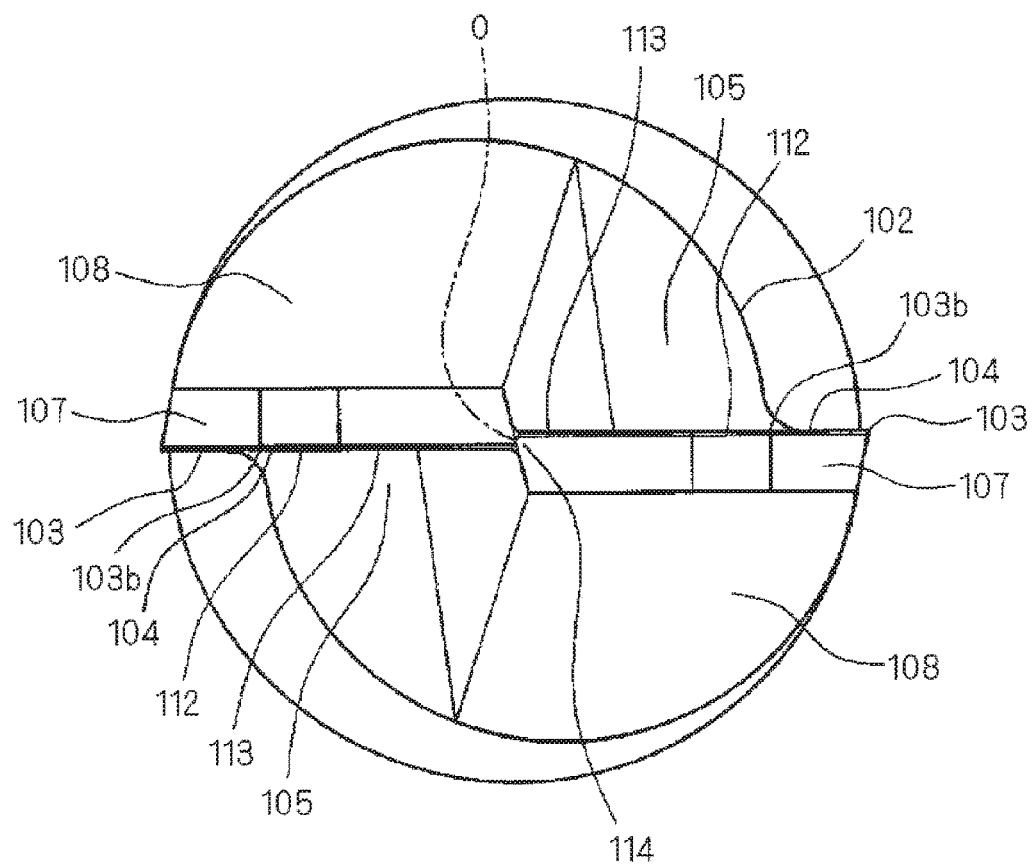
Figure 7A:
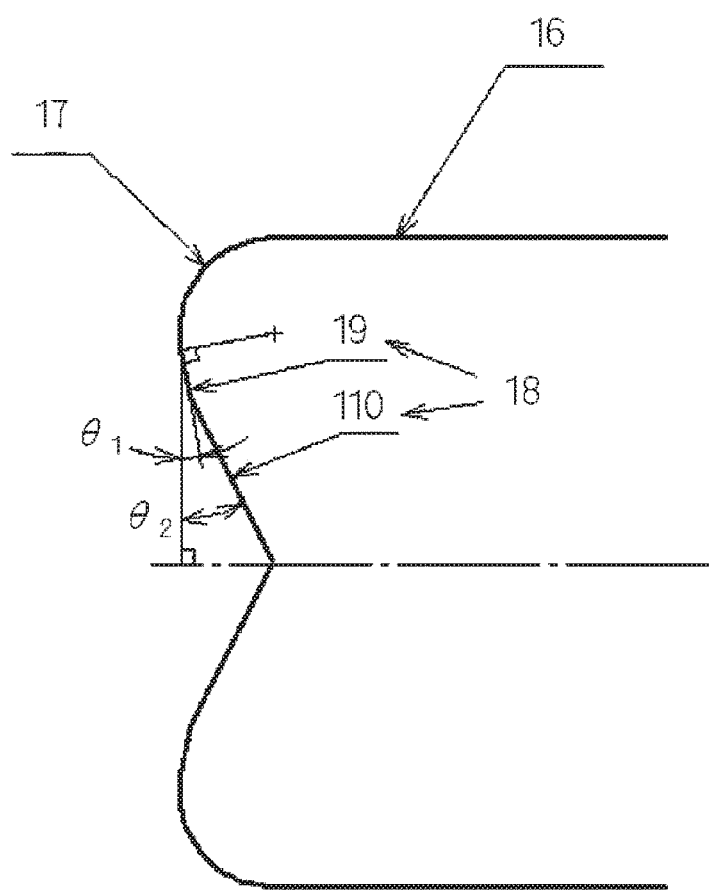
FIG. 7(a) is a side view illustrating a cutting part of a radius end mill in Patent Document 2.
Figure 7B:
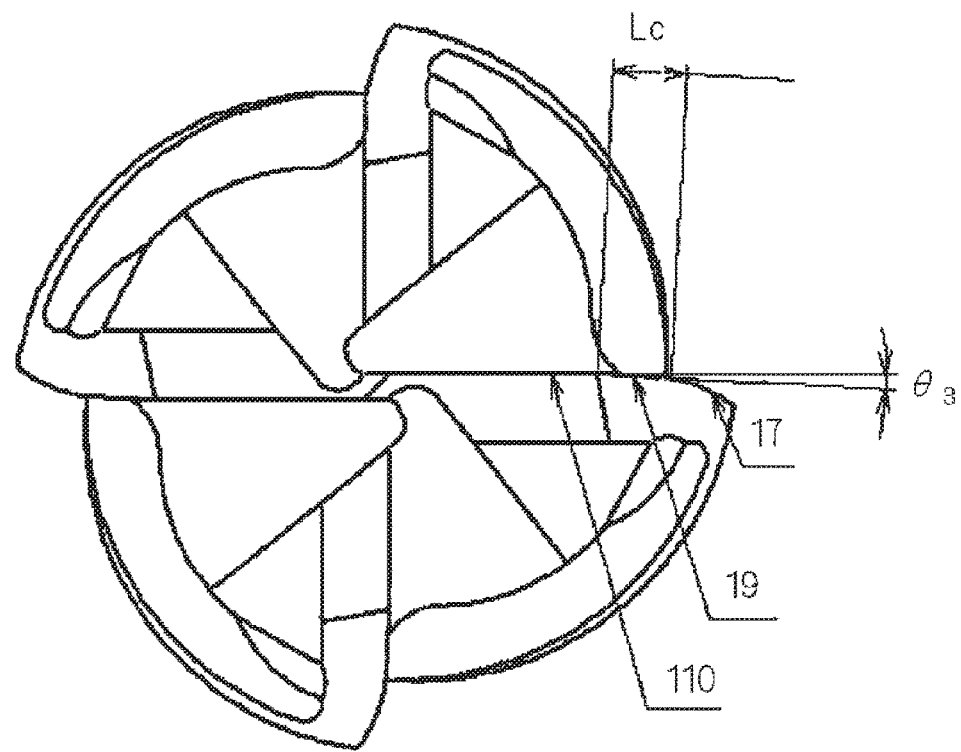
FIG. 7(b) is a bottom view of the radius end mill in Patent Document 2.

The end cutting edges 3a to 3d each configure equally divided type end cutting edges where the end cutting edges 3a to 3d are disposed at regular intervals so as to form a center angle of 90° equal to the circumferential direction (the rotation direction) around the central axis O. Such equally divided disposition makes cycles where the cutting edges 2a to 2d each in contact with the work material (the workpiece) W constant as illustrated in FIG. 5, which will be described later. Even if the feed speed and a notch are widely increased, since the cutting resistance does not become excessive, this ensures restraining the chatter vibrations.

As illustrated in FIG. 1, the respective second surfaces 40 (the flanks of the inner peripheral side end cutting edges 4) of the inner peripheral side end cutting edges 4a to 4d are coupled to one another at a part close to the central axis O and form a continuous or a continuous surface. In the case of four cutting edges, these four second surfaces 40 are collected and formed into an approximately cross shape. Such shape makes the cutting resistance applied to the respective cutting edges uniform compared with the conventional radius end mills. Therefore, even if highly efficient machining is performed, the chatter vibrations are restricted, ensuring obtaining highly accurate roughness of the processed surface.

On the rear sides of the second surfaces 40 of the respective inner peripheral side end cutting edges 4 in the rotation direction, gash wall surfaces 80, which constitute gashes 8 between the cutting edges 2 and 2 adjacent in the rotation direction, are continuously (adjacently) disposed. A convex ridgeline appears between the gash wall surface 80 and the front side of the second surface 40 in the rotation direction. The end portion of this convex ridgeline on the central axis O side intersects with the inner peripheral side end cutting edge 4 on the rear side in the rotation direction at a position outside with respect to the central axis O in the radial direction. This intersecting point becomes a starting point close to the central axis O of each of the above-described cutting edges 2a to 2d.

As a result, the collection of the second surfaces 40 of the plurality of inner peripheral side end cutting edges 4 has a concave polygonal shape continuous from a region including the central axis O to the outer peripheral sides of the respective inner peripheral side end cutting edges 4 in the radial direction in a strip shape. In the case of four cutting edges, the second surfaces 40 have the approximately cross shape. The "region including the central axis O" is a region that includes an intersection point (the starting point close to the central axis O) of: the convex ridgeline, which is located between the gash wall surface 80 and the front side of the second surface 40 in the rotation direction; and the inner peripheral side end cutting edge 4 on the rear side in the rotation direction. It can be said that the region has a polygonal shape or a circular shape.

A width of the strip-shaped region, which is continuous from the region including the central axis O to the outer peripheral side of each inner peripheral side end cutting edge 4 in the radial direction, gradually enlarges from the central axis O side to the outer peripheral side in the radial direction. When the inner peripheral side end cutting edges 4 cut a work material W, this makes a resistance (bending stress intensity) against the bending moment received around the central axis O equal (uniform) across the overall length in the radial direction.

Figure 4:
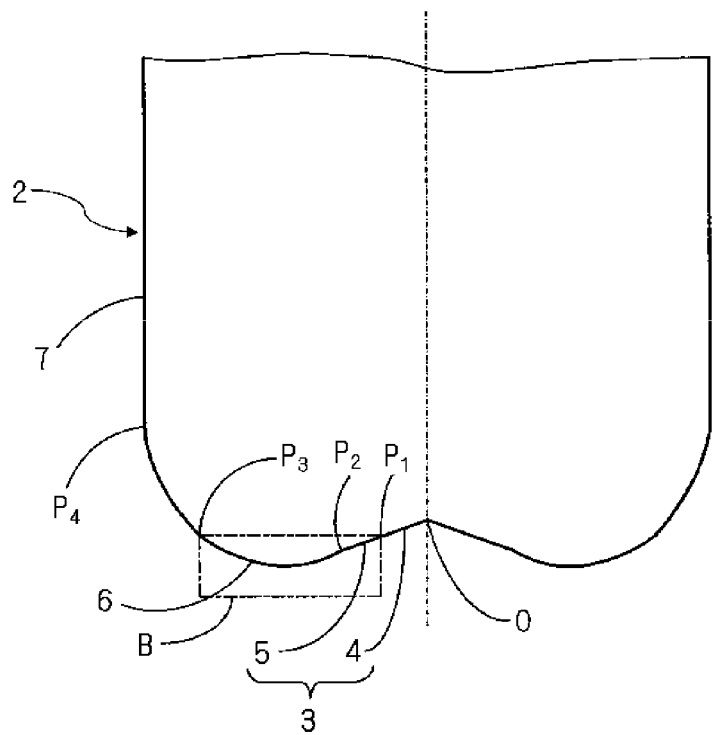
FIG. 4 is a side view schematically illustrating a main part of the radius end mill in FIG. 1.

As illustrated in FIG. 4 and FIG. 5, the radius end cutting edge 6 is formed into a shape where the positions of a lowest point Pb and a boundary P2 are adjusted such that the lowest point Pb of the radius end cutting edge 6 when the tool body 30 (the radius end mill 1) is in a cutting state is positioned in a section from the boundary (the coupling portion) P2 between an outer peripheral side end cutting edge 5 and the radius end cutting edge 6 and a boundary (a coupling portion) P4 between the radius end cutting edge 6 and the peripheral cutting edge 7. The cutting state of the tool body 30 is also is a state where the distal end portion of the tool body 30 is faced down and the tool body 30 is viewed from the side surface.

Here, to obtain the state where the radius end cutting edges 6 always cut the work material W at a part of a certain distance from a center of curvature OR even if the inclination angle of the central axis O of the tool body 30 in the cutting state changes and the cutting part of the radius end cutting edges 6 changes in the circumferential direction of the radius end cutting edges 6, the radius end cutting edges 6 are formed into the shape such that a curvature radius R in the section from boundary P2 to the boundary P4 illustrated in FIG. 5 becomes constant. In this case, in the section from the boundary P2 to the boundary P4, the distance from the center of curvature OR to the radius end cutting edges 6 becomes constant. Therefore, together with the lowest point Pb of the radius end cutting edges 6 positioning the section from the boundary P2 to boundary P4, this allows the radius end cutting edges 6 to cut the work material W while avoiding the boundary P2 to be in contact with the work material W, forming a good processed surface on the work material W.

The flanks are formed on the rear sides of the inner peripheral side end cutting edges 4 (4a to 4d), the outer peripheral side end cutting edges 5 (5a to 5d), and the radius end cutting edges 6 (6a to 6d), which constitute the cutting edges 2 (2a to 2d), in the rotation direction. The flank continuous with (adjacent to) the rear side of the inner peripheral side end cutting edge 4 in the rotation direction is the above-described second surface 40 of the inner peripheral side end cutting edge 4. The second surface 50 of the outer peripheral side end cutting edge 5 is continuous to the rear side of the outer peripheral side end cutting edge 5 in the rotation direction. A second surface 60 of the radius end cutting edge 6 is continuous to the rear side of the radius end cutting edge 6 in the rotation direction. The second surface 40 of the inner peripheral side end cutting edge 4 and the second surface 50 of the outer peripheral side end cutting edge 5 may have different surfaces from one another or may have a continuous surface via a curved surface at which the curvature consecutively changes. Similarly, the second surface 50 of the outer peripheral side end cutting edge 5 and the second surface 60 of the radius end cutting edge 6 may have different surfaces from one another or may have a continuous surface via a curved surface.

For convenience, FIG. 1 describes Sb as the boundary line that partitions the second surface 40 of the inner peripheral side end cutting edge 4 and the second surface 50 of the outer peripheral side end cutting edge 5 and SR as a boundary line that partitions the second surface 50 of the outer peripheral side end cutting edge 5 and the second surface 60 of the radius end cutting edge 6. However, there may be a case where both the boundary lines Sb and SR clearly appear or neither the boundary lines Sb nor SR clearly appear.

On rear sides of the second surface 50 of the outer peripheral side end cutting edge 5 and the second surface 60 of the radius end cutting edge 6 in the rotation direction, a third surface 51 of the outer peripheral side end cutting edge and a third surface 61 of the radius end cutting edge 6 are formed. The third surface 51 and the third surface 61 have clearance angles larger than the clearance angles of the respective second surfaces 50 and 60 and have surfaces different from one another. The third surface 51 of the outer peripheral side end cutting edge and the third surface 61 of the radius end cutting edge 6 are adjacent in the radial direction.

Figure 3A:
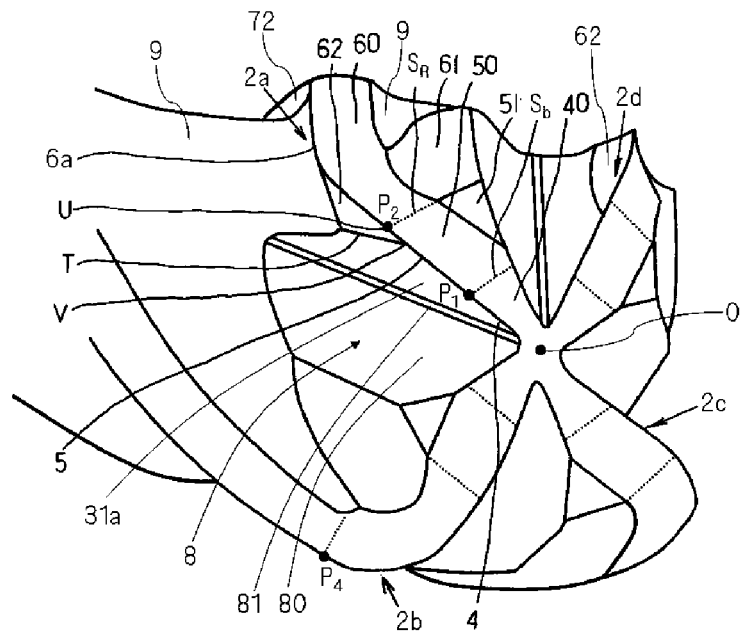
FIG. 3(*a*) is a perspective view when an end surface of the cutting edge portion of the radius end mill in FIG. 1 is viewed from a distal end side.
Figure 3B:
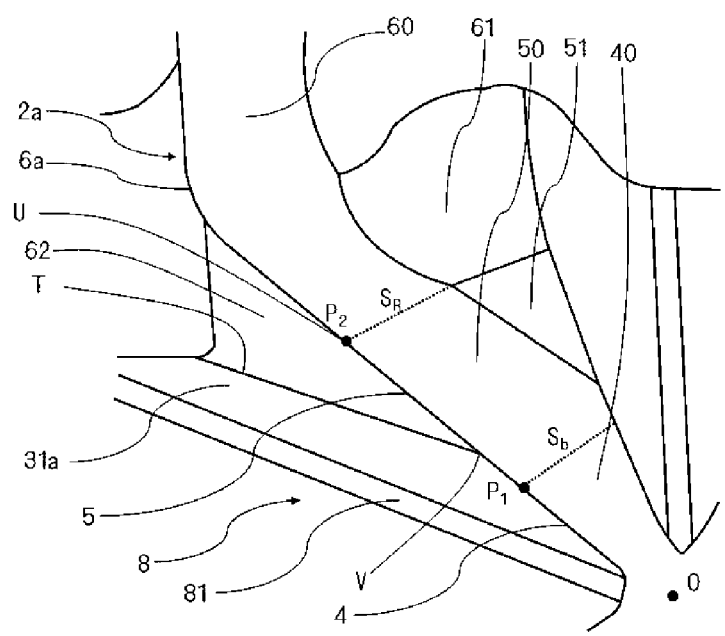
Figure 3C:
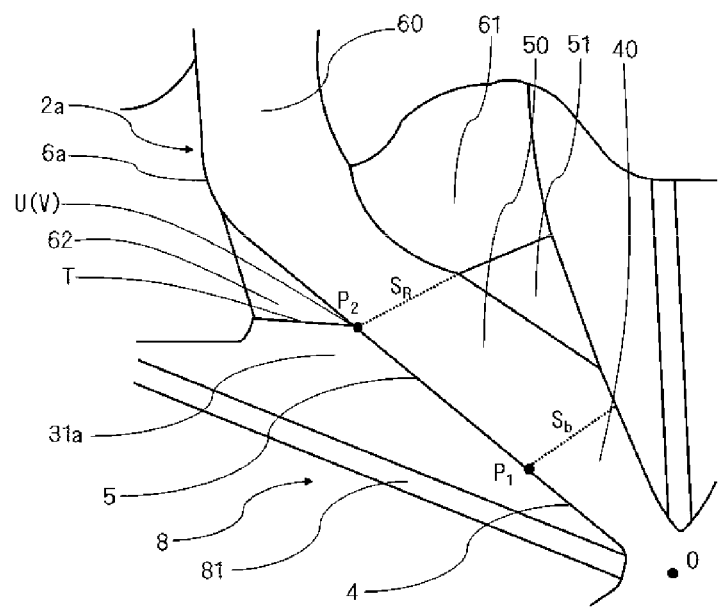

Between the front sides of the respective end cutting edges 3 (3a to 3d) and the respective radius end cutting edges 6 (6a to 6d), which are continuous in the radial direction, in the rotation direction and a section from the second surfaces 40 of the inner peripheral side end cutting edges 4 to the third surfaces 61 of the radius end cutting edges 6 through the third surfaces 51 of the outer peripheral side end cutting edges 5, the above-described gashes 8 are formed for easy discharge of swarf. As illustrated in FIG. 1 to FIG. 3, the gash 8 is configured of a face 31 of the end cutting edge 3, a face 62 of the radius end cutting edge, the above-described gash wall surface 80, and a gash bottom surface 81. The gash bottom surface 81 is adjacent to the front side of the face 62 in the rotation direction.

On the front side of each of the end cutting edges 3 (3a to 3d) in the rotation direction, the face 31 (31a to 31d) is formed (only 31a is shown in FIG. 2). As illustrated in FIG. 2 and FIG. 3-(a), the face 31 is continuous with (adjacent to or in junction with) the face 62 of the radius end cutting edge 6 via a boundary (a boundary line) T. The boundary T mainly forms a convex ridgeline.

As illustrated in FIGS. 3-(a) and (b), an intersection point U of the boundary (the boundary line) SR, which is between the second surface 60 of the radius end cutting edge 6 and the second surface 50 of the outer peripheral side end cutting edge 5, and the outer peripheral side end cutting edge 5 (the boundary P2 between the radius end cutting edge 6 and the outer peripheral side end cutting edge 5) is at a position different from an intersection point V of the boundary (the boundary line) T, which is between the face 62 of the radius end cutting edge 6 and the face 31a of the end cutting edge 3, and the outer peripheral side end cutting edge 5 or the radius end cutting edge 6. In the case where the intersection point U matches the intersection point V (FIG. 3-(c)), the resistance (the bending moment) when the work material W is cut in the section from the end cutting edge 3 to the radius end cutting edge 6 concentratedly acts on the intersection point U (the intersection point V), there is a possibility of causing a damage at the intersection point U (the intersection point V).

In contrast to this, in the case where the intersection point U and the intersection point V are at different positions, the resistance when the work material W is cut in the section from the end cutting edge 3 to the radius end cutting edge 6 decentrally acts on the intersection point U and the intersection point V. Therefore, the possibility of the damages at the intersection point U and the intersection point V are reduced, ensuring obtaining a state of stably cutting the work material W in the section from the end cutting edge 3 to the radius end cutting edge 6. In FIGS. 3-(a) and (b), the intersection point V is at a position close to the center with respect to the intersection point U in the radial direction and is on the outer peripheral side end cutting edge 5. However, to disperse the resistance during cutting into the intersection point U and the intersection point V, the intersection point V may be positioned close to the outer periphery with respect to the intersection point U in the radial direction and may be positioned on the radius end cutting edge 6.

Note that, as illustrated in FIGS. 3-(a) and (b), in the case where the intersection point V is positioned close to the center in the radial direction with respect to the intersection point U, compared with the case where both intersection points V and U match, an area (a surface area) of the face 62 of the radius end cutting edge 6 can be widely secured. This is advantageous in that a flow of swarf along the face 62 is likely to occur. As a result, the swarf is likely to flow in a constant direction, reducing an interference of the swarf to the work material. Accordingly, processed surface accuracy to the work material W can be improved. FIG. 3-(a) describes the intersection points V and U on the upper left (the upper sides of the cutting edge 2a) parts from the central axis O. However, the point that the intersection point V is positioned close to the center with respect to the intersection point U in the radial direction is similar to the other cutting edges 2b to 2d. FIG. 3-(b) illustrates an example where especially the intersection point V is positioned close to the central axis O to enlarge the area of the face 62 of the radius end cutting edge 6 more than the example in FIG. 3-(a).

As illustrated in FIG. 4 and FIG. 5, among the respective cutting edges 2 (2a to 2d), the end cutting edge 3, which is linearly formed when viewed in an elevation surface, is divided into (partitioned to) the inner peripheral side end cutting edge 4 (between O and P1) and the outer peripheral side end cutting edge 5 (between P1 and P2) via the boundary (the coupling portion) P1 as described above. In FIG. 4, the inner peripheral side end cutting edge 4 is formed longer than the outer peripheral side end cutting edge 5. However, as illustrated in FIG. 3-(a), the outer peripheral side end cutting edge 5 is formed longer than the inner peripheral side end cutting edge 4 in some cases. A section, which is the section of the radius end cutting edge 6, from the boundary (the coupling portion) P2, which is the boundary between the outer peripheral side end cutting edge 5 and the radius end cutting edge 6, to the boundary (the coupling portion) P4, which is the boundary between the radius end cutting edge 6 and the peripheral cutting edge 7, is formed into the arc shape having a constant curvature radius R (center of curvature: OR).

Thus, the section from the boundary P2 between the radius end cutting edge 6 and the outer peripheral side end cutting edge 5 to the boundary P4 between the radius end cutting edge 6 and the peripheral cutting edge 7 has the constant curvature radius R. Therefore, as described above, while the radius end cutting edges 6 cut the work material W, regardless of the change in the angle of the central axis O with respect to the work material W in the thickness direction, the boundary P2 between the radius end cutting edge 6 and the outer peripheral side end cutting edge 5 at which the curvature becomes discontinuous is not brought in contact with the work material W. This ensures obtaining a state where the work material W is always cut at the part of the radius end cutting edges 6 having the constant curvature.

The curvature radius R of the arc-shaped radius end cutting edge 6 is preferably 1% to 30% of a cutting diameter D as describe above and is more preferably 5% to 20%. The curvature radius R of less than 1% of the cutting diameter D is likely to generate a chipping due to insufficient edge strength while the curvature radius R of more than 30% of the cutting diameter D makes it difficult to form the end cutting edge 3, failing to achieve the effects of the present invention. For practical reasons, the cutting diameter D is appropriate in a range of 0.5 to 20 mm, and the preferable range is 1 to 16 mm.

As described above, the second surface 40 of the respective inner peripheral side end cutting edges 4 are coupled to one another at the center portion of the radius end mill 1, thus forming the continuous surface. This enhances tool rigidity near the central axis O, ensuring uniform cutting resistance applied to all the cutting edges 2 (2a to 2d). This restrains vibrations of the tool body 30 during cutting, ensuring improving surface accuracy of the work material W.

Moreover, the outer peripheral side end cutting edges 5 (5a to 5d) and the radius end cutting edges 6 (6a to 6d) each have the plurality of flanks (the second surfaces and the third surfaces) with different clearance angles. This smoothly couples (neighbors) the respective end cutting edges 3 (the inner peripheral side end cutting edges 4 and the outer peripheral side end cutting edges 5) and the respective radius end cutting edges 6. Accordingly, inclinations of the respective inner peripheral side end cutting edge 4 and outer peripheral side end cutting edge 5 are comparatively gentle. Therefore, for example, to perform the pocket machining on a mold, as illustrated in FIG. 5, an axial notch ap is configured such that only a part of the radius end cutting edge 6 (the arc from Pa to Pc) is in contact with the work material (the workpiece W). This ensures highly accurately finishing the processed surface like a mirror finish.

To perform a finishing process on a pocket-shaped groove formed in a mold or a similar product with the radius end mill 1 of the present invention illustrated in FIG. 1, performing contour machining (shallow cutting and high speed feeding), which is illustrated in FIG. 5, ensures obtaining the highly accurate finishing surface. In this contour machining, configuring the axial notch ap so as to meet the following conditional expressions (1) and (2) is necessary.

$$ap \leq R/20 \qquad \text{Expression (1):}$$

Note that, ap: axial notch, and

R: curvature radius of the radius end cutting edge.

$Lw < LR < R$  Expression (2):

Note that, $Lw: (R^2 - Lz^2)^{1/2}$,

LR: length from the boundary P2 between the radius end cutting edge and the outer peripheral side end cutting edge to the lowest point Pb of the radius end cutting edge, and Lz: (R−ap).

As described above, by performing the contour machining with the axial notch ap configured, among the sections (P2 to P4) of the radius end cutting edge 6 with the constant curvature, only some sections (Pa to Pc) are in contact with the work material W. The boundary P2 between the radius end cutting edge 6 and the outer peripheral side end cutting edge 5 is not in contact with the work material W. This ensures obtaining the highly accurate finishing surface on the work material W.

When the cutting edge portion 20 of the radius end mill 1 of the present invention is viewed in the direction of the central axis O, as illustrated in FIG. 1, the plurality of cutting edges 2 and the flanks are disposed on the end surface perpendicular to the central axis O. The cutting edges 2 and the flanks are arrayed at regular intervals in the rotation direction in a state where the cutting edges 2 and the flanks are symmetry with respect to a point of the central axis O. Therefore, the vibrations caused by the cutting resistance of the parts including the respective cutting edges 2 are less likely to be different. In relation to this, there is a possibility that a chattering due to resonance is likely to occur between the parts including the cutting edges 2 perpendicular to one another. However, as described above, setting the cutting conditions so as not to increase the cutting resistance ensures avoiding the chattering due to resonance, ensuring obtaining further highly accurate finishing surface.

Experimental Example 1

As a work material (sample), a rectangular parallelepiped shaped steel material (tool steel (quenching and tempering steel), HRC of 52) were prepared. Pocket machining was performed on the steel material at a length of 50 mm, a width of 20 mm, and a depth of 6 mm (the corner portions were at R=3 mm). First, using the radius end mill manufactured by Hitachi Tool Engineering, Ltd. (product name: ETM4040-10-TH, four cutting edges, cutting diameter: 4 mm, curvature radius of radius end cutting edge: 1 mm, length of cut: 2 mm, under-neck length: 12 mm, neck diameter: 3.8 mm, overall length: 60 mm, shank diameter: 6 mm, A TiSiN film was coated on the cutting edge.), crude processing was performed under the following cutting conditions.

<Crude Processing Condition>
Rotation rate of tool: 9000 min$^{-1}$
Feed speed: 1100 mm/min
ap (axial notch): 0.2 mm
ae (radial notch): 1.5 mm
Coolant: water-soluble cutting fluid Next, using the radius end mill 1 of the present invention illustrated in FIG. 1 (A base made of a WC-based cemented carbide alloy with Co content of 11 mass % was used. four cutting edges, cutting diameter: 4 mm, curvature radius of the radius end cutting edge: 1 mm, length of cut: 4 mm, under-neck length: 6 mm, neck diameter: 3.8 mm, overall length: 60 mm, shank diameter: 4 mm, The cutting edge has a TiSiN film at an average film thickness of 2 μm), the finishing process was performed under the following cutting conditions.

<Finishing Machining Condition>
Rotation rate of tool: 22000 min$^{-1}$
Feed speed: 1200 mm/min
ap (axial notch): 0.01 mm
ae (radial notch): 0.05 mm
Coolant: water-soluble cutting fluid The results of measuring the surface roughness of the obtained pocket portion of the sample after the finishing process were: Ra: 0.03 μm and Rz=0.25 μm in the feed direction and Ra: 0.02 μm and Rz=0.13 μm in the direction perpendicular to the tool feed. A level difference was not recognized between the bottom surface and the corner portion. Thus, it has been confirmed that significantly good finishing surface is obtained.

Experimental Example 2

The pocket machining was performed under the conditions similar to Experimental Example 1 other than the finishing process performed using a radius end mill manufactured by Hitachi Tool Engineering, Ltd. (product name: EPP4040-10-TH, four cutting edges, cutting diameter: 4 mm, corner radius: 1 mm, length of cut: 4 mm, under-neck length: 6 mm, neck diameter: 3.8 mm, overall length: 60 mm, shank diameter: 4 mm, The radius end mill has the base made of a WC-based cemented carbide alloy and the TiSiN film, which are identical to the radius end mill 1 of the present invention of Experimental Example 1).

The results of measuring the surface roughness of the obtained pocket portion of the sample after the finishing process were: Ra: 0.05 μm and Rz=0.4 μm in the feed direction and Ra: 0.04 μm and Rz=0.32 μm in the direction perpendicular to the tool feed. A level difference was not recognized between the bottom surface and the corner portion. Thus, it has been confirmed that good finishing surface is obtained.

The radius end mill of the present invention (Experimental Example 1) can obtain the highly accurate finishing surface compared with the conventional product (Experimental Example 2) and therefore is preferable for a mold (a mold for plastic).

FIG. 1 illustrates the example where the respective end cutting edges 3a to 3d are disposed at the equal intervals of the center angle of 90° in the circumferential direction (the rotation direction) around the central axis O. However, the magnitude of the angle formed by the adjacent end cutting edges 3 and 3 is not limited to the example in FIG. 1. It is not necessarily that the plurality of end cutting edges 3 are always arrayed at regular intervals. For example, the case where the respective end cutting edges 3a to 3d are disposed within a range of the center angle of 89° to 91° in the circumferential direction around the central axis O can also provide the effects of the present invention. Even if the end cutting edges are unequally divided outside the range, as long as the cutting conditions are appropriately selected, obtaining the effects of the present invention can be expected.

The drawing illustrates the example of the four cutting edges 2. However, with the radius end mill 1 of the present invention, the number of flutes of more than eight increases the cutting resistance, resulting in a failure such as a deterioration of the grade of the processed surface. Therefore, the number of flutes of the cutting edges 2 is preferably two to eight and more preferably three to eight in terms of stabilization of the tool body 30.

The radius end mill 1 of the present invention may not be a solid type. For example, a radius end mill configured by integrating the cutting edge portion 20, which is a part of the radius end mill 1, and a shank of another body with mechanical tightening means or by a diffused junction or a similar method is also included in the technical scope of the present invention.

DESCRIPTION OF REFERENCE SIGNS 1 radius end mill
2, 2a, 2b, 2c, 2d . . . cutting edge
3, 3a, 3b, 3c, 3d . . . end cutting edge
4, 4a, 4b, 4c, 4d . . . inner peripheral side end cutting edge
5, 5a, 5b, 5c, 5d . . . outer peripheral side end cutting edge
6, 6a, 6b, 6c, 6d . . . radius end cutting edge
7, 7a, 7b, 7c, 7d . . . peripheral cutting edge
8 . . . gash
9 . . . cutting edge groove
10, 11 . . . coupling portion
20 . . . cutting edge portion
30 . . . tool body
31, 31a, 31b, 31d . . . face of end cutting edge
40 . . . second surface of inner peripheral side end cutting edge
50 . . . second surface of outer peripheral side end cutting edge
51 . . . third surface of outer peripheral side end cutting edge
60 . . . second surface of radius end cutting edge
61 . . . third surface of radius end cutting edge
62 . . . face of radius end cutting edge
70 . . . second surface of peripheral cutting edge
72 . . . face of peripheral cutting edge
80 . . . gash wall surface
81 . . . gash bottom surface
D . . . cutting diameter
O . . . central axis
OR . . . center position of arc of radius end cutting edge
P1 . . . boundary between inner peripheral side end cutting edge and outer peripheral side end cutting edge (coupling portion)
P2 . . . boundary between outer peripheral side end cutting edge and radius end cutting edge (coupling portion)
P3 . . . display point for describing part B
P4 . . . boundary between radius end cutting edge and peripheral cutting edge (coupling portion)
Pa to Pc . . . arc of radius end cutting edge in contact with work material
Pb . . . lowest point of radius end cutting edge
Sb . . . boundary between second surface of outer peripheral side end cutting edge and second surface of inner peripheral side end cutting edge
SR . . . boundary between second surface of radius end cutting edge and second surface of outer peripheral side end cutting edge
T . . . boundary between face of radius end cutting edge and face of end cutting edge
U . . . intersection point of boundary SR and outer peripheral side end cutting edge
V . . . intersection point of boundary T and outer peripheral side end cutting edge
W . . . work material (workpiece)

The invention claimed is:
1. A radius end mill, comprising
a cutting edge portion disposed on a distal end portion of a tool body, the cutting edge portion including:
   a plurality of end cutting edges arrayed around a central axis;
   a plurality of arc-shaped radius end cutting edges continuous with the end cutting edges on an outer peripheral side in a radial direction; and
   a plurality of peripheral cutting edges continuous with the radius end cutting edges on an outer peripheral side in a radial direction, the peripheral cutting edges being disposed to extend to a rear end portion side of the tool body along cutting edge grooves, wherein:
each of the plurality of end cutting edges is divided into an inner peripheral side end cutting edge and an outer peripheral side end cutting edge in a radial direction,
each of the plurality of radius end cutting edges has a shape such that, for each of the plurality of radius end cutting edges, a lowest point of the radius end cutting edge during cutting with the tool body is positioned in a section from a boundary between the outer peripheral side end cutting edge and the radius end cutting edge to a boundary between the radius end cutting edge and the peripheral cutting edge,
respective second surfaces of the plurality of all the inner peripheral side end cutting edges are coupled to one another at a part close to the central axis, such that the second surfaces of all the inner peripheral side end cutting edges are respective portions of a single continuous surface that includes a central region, which intersects and surrounds the central axis, the single continuous surface extending radially from the central region to an outer peripheral side of each of the inner peripheral side end cutting edges in a strip shape,
a width of the strip-shaped region gradually enlarging from the central axis side to an outer peripheral side in a radial direction, and
end portions of all the inner peripheral side end cutting edges close to the central axis intersect with the boundary lines between the second surfaces of the inner peripheral side end cutting edges positioned on front sides of the inner peripheral side end cutting edges in a rotation direction and gashes formed on rear sides in the rotation direction at positions on an outer peripheral side with respect to the central axis O in a radial direction.
2. The radius end mill according to claim 1, wherein
the radius end mill has a first point on the radius end cutting edge at a position different from that of a second point on the outer peripheral side end cutting edge,
the first point is an intersection point at which a boundary line, between a second surface of the radius end cutting edge and a second surface of the outer peripheral side end cutting edge, intersects with the outer peripheral side end cutting edge, and
the second point is an intersection point at which a boundary line, between a rake face of the radius end cutting edge and a rake face of the end cutting edge, intersects with the outer peripheral side end cutting edge or the radius end cutting edge.
3. The radius end mill according to claim 2, wherein
the first point is positioned on an outer peripheral side in a radial direction with respect to the second point.
4. The radius end mill according to claim 1, wherein
when the distal end portion of the tool body is viewed from an end surface side, the plurality of end cutting edges are equally arrayed in a rotation direction of a tool body around a central axis.
5. The radius end mill according to claim 1, wherein
a curvature radius of the radius end cutting edge is in a range of 1% to 30% of a cutting diameter.

6. The radius end mill according to claim 1, wherein
a count of the end cutting edges is two to eight, at least a base constituting a cutting edge being made of a WC-based cemented carbide alloy.

7. A cutting work method, comprising:
using the radius end mill according to claim 1, in the radius end cutting edges, a section from a boundary between the outer peripheral side end cutting edge and the radius end cutting edge to a boundary between the radius end cutting edge and the peripheral cutting edge having a constant curvature radius;
configuring an axial notch on a work material on which a pocket-shaped groove is formed to meet the following conditional expressions (1) and (2):

$ap \leq R/20$      Expression (1):

ap: axial notch
R: curvature radius of a radius end cutting edge $Lw < LR < R$      Expression (2):

Lw: $(R^2 - Lz^2)^{1/2}$
LR: length from a boundary between an outer peripheral side end cutting edge and a radius end cutting edge to a lowest point of a radius end cutting edge
Lz: (R−ap); and
performing contour machining on the groove.

8. The radius end mill according to claim 2, wherein
when the distal end portion of the tool body is viewed from an end surface side, the plurality of end cutting edges are equally arrayed in a rotation direction of a tool body around a central axis.

9. The radius end mill according to claim 3, wherein
when the distal end portion of the tool body is viewed from an end surface side, the plurality of end cutting edges are equally arrayed in a rotation direction of a tool body around a central axis.

10. The radius end mill according to claim 2, wherein
a curvature radius of the radius end cutting edge is in a range of 1% to 30% of a cutting diameter.

11. The radius end mill according to claim 3, wherein
a curvature radius of the radius end cutting edge is in a range of 1% to 30% of a cutting diameter.

12. The radius end mill according to claim 4, wherein
a curvature radius of the radius end cutting edge is in a range of 1% to 30% of a cutting diameter.

13. The radius end mill according to claim 2, wherein
a count of the end cutting edges is two to eight, at least a base constituting a cutting edge being made of a WC-based cemented carbide alloy.

14. The radius end mill according to claim 3, wherein
a count of the end cutting edges is two to eight, at least a base constituting a cutting edge being made of a WC-based cemented carbide alloy.

15. The radius end mill according to claim 4, wherein
a count of the end cutting edges is two to eight, at least a base constituting a cutting edge being made of a WC-based cemented carbide alloy.

16. The radius end mill according to claim 5, wherein
a count of the end cutting edges is two to eight, at least a base constituting a cutting edge being made of a WC-based cemented carbide alloy.

17. A cutting work method, comprising:
using the radius end mill according to claim 2, in the radius end cutting edges, a section from a boundary between the outer peripheral side end cutting edge and the radius end cutting edge to a boundary between the radius end cutting edge and the peripheral cutting edge having a constant curvature radius;
configuring an axial notch on a work material on which a pocket-shaped groove is formed to meet the following conditional expressions (1) and (2):

$ap \leq R/20$      Expression (1):

ap: axial notch
R: curvature radius of a radius end cutting edge $Lw < LR < R$      Expression (2):

Lw: $(R^2 - Lz^2)^{1/2}$
LR: length from a boundary between an outer peripheral side end cutting edge and a radius end cutting edge to a lowest point of a radius end cutting edge
Lz: (R−ap); and
performing contour machining on the groove.

18. A cutting work method, comprising:
using the radius end mill according to claim 3, in the radius end cutting edges, a section from a boundary between the outer peripheral side end cutting edge and the radius end cutting edge to a boundary between the radius end cutting edge and the peripheral cutting edge having a constant curvature radius;
configuring an axial notch on a work material on which a pocket-shaped groove is formed to meet the following conditional expressions (1) and (2):

$ap \leq R/20$      Expression (1):

ap: axial notch
R: curvature radius of a radius end cutting edge $Lw < LR < R$      Expression (2):

Lw: $(R^2 - Lz^2)^{1/2}$
LR: length from a boundary between an outer peripheral side end cutting edge and a radius end cutting edge to a lowest point of a radius end cutting edge
Lz: (R−ap); and
performing contour machining on the groove.

19. A cutting work method, comprising:
using the radius end mill according to claim 4, in the radius end cutting edges, a section from a boundary between the outer peripheral side end cutting edge and the radius end cutting edge to a boundary between the radius end cutting edge and the peripheral cutting edge having a constant curvature radius;
configuring an axial notch on a work material on which a pocket-shaped groove is formed to meet the following conditional expressions (1) and (2):

$ap \leq R/20$      Expression (1):

ap: axial notch
R: curvature radius of a radius end cutting edge $Lw < LR < R$      Expression (2):

Lw: $(R^2 - Lz^2)^{1/2}$
LR: length from a boundary between an outer peripheral side end cutting edge and a radius end cutting edge to a lowest point of a radius end cutting edge
Lz: (R−ap); and
performing contour machining on the groove.

20. A cutting work method, comprising:
using the radius end mill according to claim 5, in the radius end cutting edges, a section from a boundary between the outer peripheral side end cutting edge and the radius end cutting edge to a boundary between the radius end cutting edge and the peripheral cutting edge having a constant curvature radius;

configuring an axial notch on a work material on which a pocket-shaped groove is formed to meet the following conditional expressions (1) and (2); and performing contour machining on the groove:

$$ap \leq R/20 \qquad \text{Expression (1):}$$

ap: axial notch
R: curvature radius of a radius end cutting edge $$Lw < LR < R \qquad \text{Expression (2):}$$

Lw: $(R^2 - Lz^2)^{1/2}$
LR: length from a boundary between an outer peripheral side end cutting edge and a radius end cutting edge to a lowest point of a radius end cutting edge
Lz: (R−ap); and performing contour machining on the groove.

* * * * *

UNITED STATES PATENT AND TRADEMARK OFFICE
CERTIFICATE OF CORRECTION

PATENT NO. : 9,901,995 B2
APPLICATION NO. : 15/032521
DATED : February 27, 2018
INVENTOR(S) : Makoto Baba It is certified that error appears in the above-identified patent and that said Letters Patent is hereby corrected as shown below:

In the Drawings

Sheet 4 of 7, Delete Fig. 5 and insert the corrected Fig. 5, as shown on the attached sheet.

Signed and Sealed this
Eighth Day of May, 2018

Andrei Iancu
*Director of the United States Patent and Trademark Office*